United States Patent [19]
Putzig

[11] 3,821,195
[45] June 28, 1974

[54] SYNTHESIS OF CYANOAZO DYES
[75] Inventor: Donald Edward Putzig, Newark, Del.
[73] Assignee: E. I. du Pont de Nemours and Company, Wilmington, Del.
[22] Filed: May 1, 1972
[21] Appl. No.: 249,209

[52] U.S. Cl................ 260/206, 260/205, 260/207, 260/207.1, 260/208, 260/465 R
[51] Int. Cl............................................. C09b 43/00
[58] Field of Search ........ 260/205, 206, 207, 207.1, 260/207.3, 207.5, 208, 465 R

[56] References Cited
FOREIGN PATENTS OR APPLICATIONS
1,184,825   3/1970   Great Britain...................... 260/207

Primary Examiner—Lorraine A. Weinberger
Assistant Examiner—C. F. Warren

[57] ABSTRACT

An improved process for replacing a bromo substituent with a cyano substituent in the production of a cyanoazo dye, which process comprises reacting cuprous cyanide and a bromo-azo dye having a bromo substituent in an aromatic ring position ortho to the azo group, for example 2-(2'-bromo-4', 6'-dinitrophenylazo)-5-diethylaminoacetanilide, in the presence of pyridine, at an elevated temperature, to produce the corresponding cyanoazo dye, for example, 2-(2'-cyano-4',6'-dinitrophenylazo)-5-diethylaminoacetanilide, the improvement consisting of carrying out the reaction in the monomethyl or monoethyl ether of ethylene or diethylene glycol at a temperature of 75°C. to the boiling point of the glycol.

11 Claims, No Drawings

SYNTHESIS OF CYANOAZO DYES

BACKGROUND OF THE INVENTION

1. Field of the Invention

This invention relates to the preparation of cyanoazo dyes.

2. Description of the Prior Art

The replacement of a halogen atom with a cyano group in cyclic compounds, for example, aromatic ring systems, is well known. U.S. Pat. No. 2,195,076 discloses such a replacement by means of cuprous cyanide in the form of a double compound with a base such as pyridine, quinoline, piperidine, benzonitrile or an alkylamine. A diluent can be present, such as nitrobenzene, alkoxybenzene, chlorobenzene, formamide, acetamide and the like.

British Pat. No. 1,125,683 discloses that such a replacement reaction can be carried out in an organic medium to provide azo dyes having a cyano substituent in the aromatic ring position which is ortho to the azo group. Suitable organic media are, in particular, polar aprotic organic solvents, such as formamide, dimethylformamide, pyridine, quinoline, nitrobenzene and the like. In general, such azo dyes as prepared by prior art procedures contain undesirable colored impurities, necessitating recrystallization of the dye to achieve maximum clarity and brightness of shade.

SUMMARY OF THE INVENTION

It is an object of this invention to provide a process for preparing azo dyes having a cyano substituent in an aromatic ring position which is ortho to the azo group. It is a further object to prepare such cyanoazo dyes from the corresponding bromoazo dyes. Another object is to provide a process which directly yields cyanoazo dyes of high purity. A still further object is to provide cyanoazo dyes which do not require purification before being used in dyeing processes.

In summary, the invention resides in an improved process for preparing a cyanoazo dye having a cyano substituent in an aromatic ring position ortho to the azo group by reacting the corresponding bromoazo dye and cuprous cyanide, to replace the bromo substituent with the cyano substituent, in the presence of pyridine, at an elevated temperature, the improvement consisting of carrying out the reaction in the monomethyl or monoethyl ether of ethylene or diethylene glycol, at a temperature of 75°C. to the boiling point of the glycol, the atmospheric pressure boiling points being approximately as follows:

| | |
|---|---|
| ethylene glycol monomethyl ether | 124–5°C. |
| ethylene glycol monoethyl ether | 135°C. |
| diethylene glycol monomethyl ether | 193°C. |
| diethylene glycol monoethyl ether | 202°C. |

DETAILED DESCRIPTION OF THE INVENTION

The present invention resides in an improved process for replacing a bromo substituent with a cyano substituent in the production of a cyanoazo dye, which process comprises reacting cuprous cyanide and a bromoazo dye having a bromo substituent in an aromatic ring position ortho to the azo group, in the presence of pyridine, at an elevated temperature, to produce the corresponding cyanoazo dye, the improvement consisting of carrying out the reaction in the monomethyl or monoethyl ether of ethylene or diethylene glycol at a temperature of 75°C. to the boiling point of the glycol. The dye products prepared by this improved process are of such high purity that they can be used directly in dyeing operations without prior recrystallization or purification and/or are obtained in significantly higher yields than when prepared by prior art procedures employing other organic reaction media.

The glycols employed herein possess the advantages that they are inexpensive, odorless and non-toxic. Because of their lower costs and lower boiling points, thus simplifying recovery, for example, by distillation, the ethylene glycol ethers are preferred.

The dyes which are prepared by the improved process of this invention are well known cyanoazo dyes which can be represented by the formula A—N=N—K wherein A is an aromatic carbocyclic radical having a cyano substituent in an aromatic ring position ortho to the azo group and K is the radical of a coupling component, preferably an N-substituted paraaminoarylene radical. The bromo precursors, that is, the starting materials which are operable in the improved process of this invention, are equally well known.

In carrying out the process of this invention the reaction mixture comprises the bromo precursor, cuprous cyanide, pyridine and the glycol.

The amount of cuprous cyanide in the reaction mixture should be at least stoichiometric with the number of obromine atoms being replaced with cyano groups. A large excess should be avoided in order to minimize the amount of toxic cyanide ion in the product and/or mother liquors and to minimize undesirable shade effects caused by the interaction of copper ions and certain metal-sensitive cyanoazo dyes. The preferred amount of cuprous cyanide is 1.05–1.2 equivalents per atom of bromine being replaced.

The preferred amount of pyridine is 2.5–3.5 moles per mole of bromo dye precursor. At lower concentrations the reaction becomes increasingly sluggish; significantly greater amounts of pyridine have been found to decrease the yield of product.

The reaction can be carried out at any temperature from about 75°C. to the reflux temperature of the glycol. The preferred temperature is 90–110°.

The extent of reaction if readily measured by thin layer chromatography. The product is isolated by cooling the reaction mass to ambient temperature and filtering. It is advantageous to remove the relatively high boiling solvent (glycol) by washing the filter cake with a lower alcohol such as methanol, ethanol or isopropanol. Removal of copper ions can then be effected by slurrying the solids in or washing them with aqueous ammonia. Finally, the product is washed thoroughly with water and dried.

The known cyanoazo dyes which are produced by the improved process of this invention are useful for dyeing synthetic fibers, particularly polyethylene terephthalate. Especially useful dyes prepared by this process vary in shade from orange to greenish blue. The cyanoazo dyes can be used to dye textile materials by known procedures. For example, a Thermosol procedure or an atmospheric or super-atmospheric pressure procedure employing an aqueous dyebath can be used.

EXAMPLE 1

Preparation of 2-(2'-cyano-4',6'-dinitrophenylazo)-5-dibenzylamino-4-methoxyacetanilide A mixture of 21.1 parts of 2-(2'-bromo-4',6'-dinitrophenylazo)-5-dibenzylamino-4-methoxyacetanilide, 3.3 parts of cuprous cyanide, 195 parts of 2-methoxyethanol and 10 parts of pyridine was stirred at 80°–90°C. for 45 minutes. The reaction mixture was cooled to room temperature and the solids were isolated by filtration, washed with water, reslurried in 300 parts of 14% aqueous ammonia to remove copper ions, isolated by filtration, washed with water and dried. Fifteen parts of the expected blue dye were obtained. Thin layer chromatography (TLC) showed that it contained only a trace of a second blue component; the trace impurity was not removed by recrystallization from 2-methoxyethanol. The dye had a m.p. of 178°–181°C. and an absorptivity of 108 liters/gram/cm. at 633 m$\mu$. Calc'd. for $C_{30}H_{25}N_7O_6$: C, 62.1; H, 4.4; N, 16.9%. Found C, 62.0; H, 4.5; N, 16/4%.

EXAMPLE 2

Preparation of N,N-dibenzyl-4-(2'-cyano-4',6'-dinitrophenylazo)-2,5-dimethoxyaniline A mixture of 20.2 parts of N,N-dibenzyl-(2'-bromo-4',6'-dinitrophenylazo)-2,5-dimethoxyaniline, 3.3 parts of cuprous cyanide, 195 parts of 2-methoxyethanol and 10 parts of pyridine was stirred for two hours at 80°–85°C. The reaction mixture was cooled to room temperature and the solids were isolated by filtration, washed with water, reslurried in 300 parts of 14% aqueous ammonia, isolated by filtration, washed thoroughly with water and dried. The expected blue dye was chromatographically pure (by TLC). After recrystallization from 2-methoxyethanol the dye had a m.p. of 181°–184°C. and an absorptivity of 80.3 liters/gram/cm. at 606 m$\mu$ Calc'd. for $C_{29}H_{24}N_6O_6$: C, 63.0; H, 4.4; N, 15.2%. Found: C 63.3; H, 4.8; N, 14.9%.

EXAMPLE 3

Preparation of 2-(2',6'-dicyano-4'-nitrophenylazo)-5-diethylaminoacetanilide

A mixture of 21.4 parts of 2-(2',6'-dibromo-4'-nitrophenylazo)-5-diethylaminoacetanilide, 7.4 parts ofcuprous cyanide, 9.5 parts of pyridine and 150 parts of 2-methoxyethanol was heated at 90°–100°C. for 6 hours. The reaction mixture was cooled to room temperature and the solids were isolated by filtration, washed in turn with isopropanol, 14% aqueous ammonia and water and dried. The chromatographically pure (by TLC), expected, greenish-blue, dicyano dye which was obtained had the same shade and $R_f$ value as an authentic sample of the dicyano dye; the yield of dye was 19.2 parts. It had an absorptivity of 133 lites/gram/cm. at 620 m$\mu$.

EXAMPLE 4

Preparation of 2-(2'-cyano-4',6'-dinitrophenylazo)-5-diethylaminoacetanilide A mixture 18 parts of 2-bromo-4',6'-dinitrophenylazo)-5-diethylaminoacetanilide, 4 parts of cuprous cyanide, 195 parts of 2-methoxyethanol and 10 parts of pyridine was stirred at 90°C. for 8 hours. The mass was cooled to room temperature and the solids were isolated by filtration, washed in turn with isopropanol, 14% aqueous ammonia and water and dried. The yield was 14.3 parts of the expected blue dye which TLC showed to contain an almost imperceptible trace of a violet impurity. The dye had an absorptivity of 163 liters/gram/cm. at 605 m$\mu$.

When the reaction was repeated except that pyridine was replaced with an equimolar amount of piperidine, ethylenediamine or triethylamine, the aforesaid violet impurity was formed in considerably greater amounts. The impure dyes (in contrast to the aforesaid pure dye) exhibited redness and dullness of shade when applied to polyester fabrics by a conventional aqueous procedure.

EXAMPLE 5

Preparation of 2-(2'-cyano-4',6'-dinitrophenylazo)-5-diethylaminoacetanilide

Example 4 was repeated except that the 195 parts of 2-methoxyethanol were replaced with 160 parts of 2-ethoxy-ethanol and the reaction time was reduced to two hours. 15.0 Parts of the expected blue dye were obtained; TLC showed that it contained no colored impurities.

EXAMPLE 6

Preparation of 2-(2'-cyano-4',6'dinitrophenylazo5-diethylaminoacetanilide

A mixture of 9 parts of 2-(2'-bromo-4',6'-dinitrophenylazo)-5-diethylaminoacetanilide, 2 parts of cuprous cyanide, 100 parts of diethylene glycol monomethyl ether and 5 parts of pyridine was stirred at 140°C. for 30 minutes and then at 100°C. for 1 hour. The mass was cooled to room temperature and the solids were isolated by filtration, washed in turn with isopropanol, 14% aqueous ammonia and water and dried, yielding 5.6 parts of the chromatographically pure (by TLC), expected, dye product which had an absorptivity of 156 liters/gram/cm. at 605 m$\mu$.

EXAMPLE 7

Preparation of 2-(2'-cyano-4',6'-dinitrophenylazo)-5-diethylaminoacetanilide

Example 6 was repeated except that the 100 parts of diethylene glycol monomethyl ether were replaced with 100 parts of diethylene glycol monoethyl ether. The expected dye was obtained in yield and purity comparable to that achieved in Example 6.

EXAMPLE 8

Preparation of 2-(2'-cyano-4'-nitrophenylazo)-5-diethylaminoacetanilide

A mixture of 13.1 parts of 2(2'-bromo-4'-nitrophenylazo)-5-diethylaminoacetanilide, 2.8 parts of cuprous cyanide, 125 parts of 2-methoxyethanol and 6 parts of pyridine was stirred at 90°C. for 3.5 hours. The product was isolated, washed and dried as described in Example 3. The yield of chromatographically pure (by TLC), expected, violet dye was 9.4 parts; it had an absorptivity of 146 liters/gram/cm. at 560 m$\mu$.

EXAMPLE 9

Preparation of 2-(2'-cyanophenylazo)-5-diethylaminoacetanilide

A mixture of 16.2 parts of 2-(2'-bromophenylazo)-5-diethylaminoacetanilide, 4 parts of cuprous cyanide, 8 parts of pyridine and 155 parts of 2-methoxyethanol was heated at 90–100 C. for 8 hours. The reaction mixture was cooled and diluted with water. The gummy solid which separated gradually solidified. The expected, red, dye product was isolated, washed and dried as described in Example 3. TLC indicated the presence of a very small amount of orange starting material and an almost imperceptible amount of another orange impurity.

The embodiments of the invention in which an exclusive property or privilege is claimed are defined as follows:

1. In an improved process for replacing a bromo substituent with a cyano substituent in the production of a cyanoazo dye, which process comprises reacting cuprous cyanide and a bromoazo dye having a bromo substituent in an aromatic ring position ortho to the azo group, in the presence of pyridine, at an elevated temperature, to produce the corresponding cyanoazo dye, the improvement consisting of carrying out the reaction in the monomethyl or monoethyl ether of ethylene or diethylene glycol at a temperature of 75 C. to the boiling point of the glycol.

2. The process of claim 1 wherein the cyanoazo dye has the formula A—N N—K wherein A is an aromatic carbocyclic radical having a cyano substituent in an aromatic ring position ortho to the azo group and K is an N-substituted para-aminoarylene radical.

3. The process of claim 2 which is carried out at 90–110 C.

4. The process of claim 2 wherein the glycol is 2-methoxyethanol.

5. The process of claim 2 wherein the glycol is 2-ethoxyethanol.

6. The process of claim 2 wherein the cyanoazo dye is 2-(2-cyano-4,6-dinitrophenylazo)-5-dibenzylamino-4-methoxyacetanilide.

7. The process of claim 2 wherein the cyanoazo dye is N,N-dibenzyl-4-(2-cyano-4,6-dinitrophenylazo)-2,5-dimethoxyaniline.

8. The process of claim 2 wherein the cyanoazo dye is 2(2-cyano-4,6-dinitrophenylazo)-5diethylaminoacetanilide.

9. The process of claim 2 wherein the cyanoazo dye is 2(2,6-dicyano-4-nitrophenylazo)-5diethylaminoacetanilide.

10. The process of claim 2 wherein the cyanazo dye is 2(2-cyano-40-nitrophenylazo)-5-diethylaminoacetanilide.

11. The process of claim 2 wherein the cyanoazo dye is 2-(2-cyanophenylazo)-5-diethylaminoacetanilide.

* * * * *

UNITED STATES PATENT OFFICE
CERTIFICATE OF CORRECTION

Patent No. 3,821,195  Dated June 28, 1974

Inventor(s) Donald Edward Putzig

It is certified that error appears in the above-identified patent and that said Letters Patent are hereby corrected as shown below:

Column 5, line 21, "75 C." should be -- 75°C. --; line 24, "A-N N-K" should be -- A-N=N-K --. Column 6, line 3, "90-110 C" should be -- 90-110°C --; line 9, "2-(2 -cyano-4, 6 -dinitrophenylazo)-5-" should be -- 2-(2'-cyano-4',6'-dinitrophenylazo)-5- --; line 12, "(2 -cyano-4, 6 -dinitrophenylazo)-" should be -- (2'-cyano-4',6'-dinitrophenylazo)- --; line 15, "2(2 -cyano-4, 6 -dinitrophenylazo)-" should be -- 2(2'-cyano-4',6'-dinitrophenylazo)- --; line 16, "5diethylaminoacetanilide" should be -- 5-diethylaminoacetanilide --; line 18, "2(2, 6 -dicyano-4 -nitrophenylazo)-" should be -- 2(2',6'-dicyano-4'-nitrophenylazo)- --; line 19, "5diethylaminoacetanilide" should be -- 5-diethylaminoacetanilide --; line 21, "cyanazo" should be -- cyanoazo --; line 22, "2(2 -cyano-40-nitrophenylazo)-5-" should be -- 2(2'-cyano-4'-nitrophenylazo)-5- --; line 25, "2-(2 -cyanophenylazo)-5-diethylaminoacetanilide" should be -- 2-(2'-cyanophenylazo)-5-diethylaminoacetanilide --.

Signed and sealed this 29th day of October 1974.

(SEAL)
Attest:

McCOY M. GIBSON JR.
Attesting Officer

C. MARSHALL DANN
Commissioner of Patents